United States Patent
Antczak et al.

(10) Patent No.: US 6,422,861 B1
(45) Date of Patent: Jul. 23, 2002

(54) QUARTZ FUSION FURNACE AND METHOD FOR FORMING QUARTZ ARTICLES

(75) Inventors: Stanley M. Antczak, Chesterland; Frederic F. Ahlgren, Highland Heights, both of OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/717,395

(22) Filed: Nov. 20, 2000

(51) Int. Cl.$^7$ .............................................. F27B 14/18
(52) U.S. Cl. ..................... 432/13; 432/264; 373/111; 222/146.5
(58) Field of Search ........................ 432/13, 156, 161, 432/248, 264; 219/421, 424; 373/111; 222/146.5

(56) References Cited

U.S. PATENT DOCUMENTS

| | | |
|---|---|---|
| 1,536,821 A | 5/1925 | Devers |
| 1,992,994 A | 3/1935 | Delpech |
| 2,038,627 A | 4/1936 | Badger |
| 2,485,851 A | 10/1949 | Stevens |
| 2,852,891 A | 9/1958 | George |
| 2,998,469 A | 8/1961 | Vatterodt |
| 3,128,169 A | 4/1964 | Heraeus et al. |
| 3,205,292 A | 9/1965 | Descarsin |
| 3,212,871 A | 10/1965 | Vatterodt |
| 3,320,045 A | 5/1967 | Weiss et al. |
| 3,395,997 A | 8/1968 | Bryant et al. |
| 3,764,286 A | 10/1973 | Antczak et al. |
| 4,242,553 A | * 12/1980 | Berkman et al. ............ 432/264 |
| 4,356,152 A | * 10/1982 | Berkman et al. ............ 432/264 |
| 4,519,814 A | * 5/1985 | Demarest, Jr. ............... 432/13 |
| 4,545,798 A | * 10/1985 | Matesa ........................ 432/264 |
| 5,548,611 A | * 8/1996 | Cusick et al. ................ 432/13 |
| 5,934,900 A | * 8/1999 | Billings ....................... 432/264 |

* cited by examiner

Primary Examiner—Gregory Wilson
(74) Attorney, Agent, or Firm—Fay, Sharpe, Fagan, Minnich & McKee, LLP

(57) ABSTRACT

A crucible for melting a silica for fusion of said silica into a desired shape. The crucible having a main body with inner and outer surfaces comprised of a refractory material. In addition, the inner surface adjacent at least a melting zone of the furnace includes a substantially gas-tight barrier layer comprised of a material selected from rhenium, osmium, iridium, and mixtures thereof.

18 Claims, 2 Drawing Sheets

QUARTZ FUSION FURNACE AND METHOD FOR FORMING QUARTZ ARTICLES

BACKGROUND OF THE INVENTION

The present invention relates to an apparatus for the production of tubing, rods and the like from crystalline quartz or other glass like materials. Particularly, this invention relates to an apparatus for use in the production of elongated quartz members from a silica melt. The present invention is particularly directed to the manufacture of fused silica tubes for use in the manufacture of optical fibers.

Various types of elongated members have been formed continuously by melting of quartz crystal or sand in an electrically heated furnace whereby the desired shape is drawn from the furnace through a suitable orifice or die in the bottom of the furnace as the raw material is melted. One apparatus for continuous production of fused quartz tubing, for example, is a tungsten-lined molybdenum crucible supported vertically and having a suitable orifice or die in the bottom to draw cane, rods, or tubing. The crucible is surrounded by an arrangement of tungsten heating elements or rods which heat the crucible. The crucible, together with its heating unit, is encased in a refractory chamber supported by a water-cooled metal jacket. The crucible is heated in a reducing atmosphere of nitrogen and hydrogen.

An alternative apparatus provides fused quartz tubing by feeding natural quartz crystal into a refractory metal crucible heated by electrical resistance under a particular gas atmosphere to reduce the bubble content. The bubbles formed by gas entrapment between crystals and the molten viscous mass of fused quartz do not readily escape from the molten glass and, hence, remain as bubbles or lines in the product drawn from the fused quartz melt. By substituting a melting atmosphere gas which readily diffuses through the molten material (such as pure helium, pure hydrogen or mixtures of these gases) the gas pressure in the bubbles is reduced and thereby the bubble size is reduced. This process uses a mixture of 80% helium and 20% hydrogen by volume.

In a further alternative method, a product is obtained by continuously feeding a raw material of essentially pure silicon dioxide in particulate form into the top section of an induction-heated crucible, fusing the raw material continuously in an upper-induction heat zone of the crucible in an atmosphere of hydrogen and helium while maintaining a fusion temperature not below approximately 2050° C. The fused material in the lower zone of the crucible is heated by separate induction heating means to produce independent regulation of the temperature in the fused material. The fused material is continuously drawn from the lower zone of the crucible through forming means in the presence of an atmosphere of hydrogen containing a non-oxidizing carrier gas.

Unfortunately, most of the refractory metal and non-metal materials used in the crucibles of the above-described apparatus are undesirable impurities if present in the drawn silica article. Such refractory material contamination causes discoloration and occlusions in the silica glass. Furthermore, the presence of refractory material particles can degrade the strength of the resultant silica article. Moreover, the particles become a flaw in the drawn article that can cause the strand to break.

Accordingly, there is a need in the art to reduce contamination of fused glass occurring from the refractory materials used in constructing the furnace. This need has increased recently as semiconductor and fiber optics manufacturing processes, a primary use for the glass products obtained from the subject process, have required higher levels of purity and performance.

Unfortunately, because the furnace is typically constructed of refractory materials, the manufacturing plant is usually contaminated therewith. Accordingly, even a furnace having melting and drawing zones insulated from refractory materials cannot fully prevent contamination. It would therefore be desirable to have available an apparatus which facilitates removing and/or reducing the effect of refractory materials contamination on the resultant silica article.

BRIEF SUMMARY OF THE INVENTION

In an exemplary embodiment of the invention, a furnace for melting of the silica and subsequent drawing into a desired shape is comprised of a body having an outer surface constructed of a refractory metal and including a substantially gas impermeable inner lining extending from at least slightly below a melt line throughout the melt zone of the furnace. The lining is comprised of a non-reactive barrier material. The lining is preferably formed of rhenium, osmium, iridium, platinum or mixtures thereof. Preferably, the furnace will include an inlet tube for introduction of a gas to the melt zone, the outer circumference of the inlet tube forming a gas-tight seal with the lining. In addition, a silica raw material feeder tube, or a protection sheath circumferentially disposed around the tube is provided, the outer circumference of the feeder tube forming a gas tight seal with the lining.

The present crucible construction provides a number of advantages. Particularly, furnaces constructed with a substantially gas-tight rhenium, iridium, platinum and/or osmium lined melting zone can produce products with much lower levels of refractory metal in the solution. For example, the metal dissolved in the silica can be reduced to below about 1 ppb and preferably below the current level of detection via NAA. This reduced amount of refractory metal contamination in the silica melt improves the chemical composition of the silica glass allowing for a decrease in discoloration and surface haze. Furthermore, utilization of a furnace equipped with a crucible including the non-reactive lining in the melt zone allows operation at optimum temperature ranges and in the presence of a desired atmosphere to reduce or eliminate contaminants.

It should be noted that the terms "quartz" and "silica" are used interchangeably throughout this application, both being directed generally to the compound $SiO_2$. Nonetheless, the present invention encompasses the use of any raw material introduced to the melting furnace, including but not limited to natural silica/quartz and synthetic silica.

BRIEF DESCRIPTION OF THE DRAWINGS

The structure, operation and advantages of the present preferred embodiment of this invention will become further apparent upon consideration of the following description, taken in conjunction with the accompanying drawings, wherein.

DETAILED DESCRIPTION OF THE INVENTION

Figure 1:
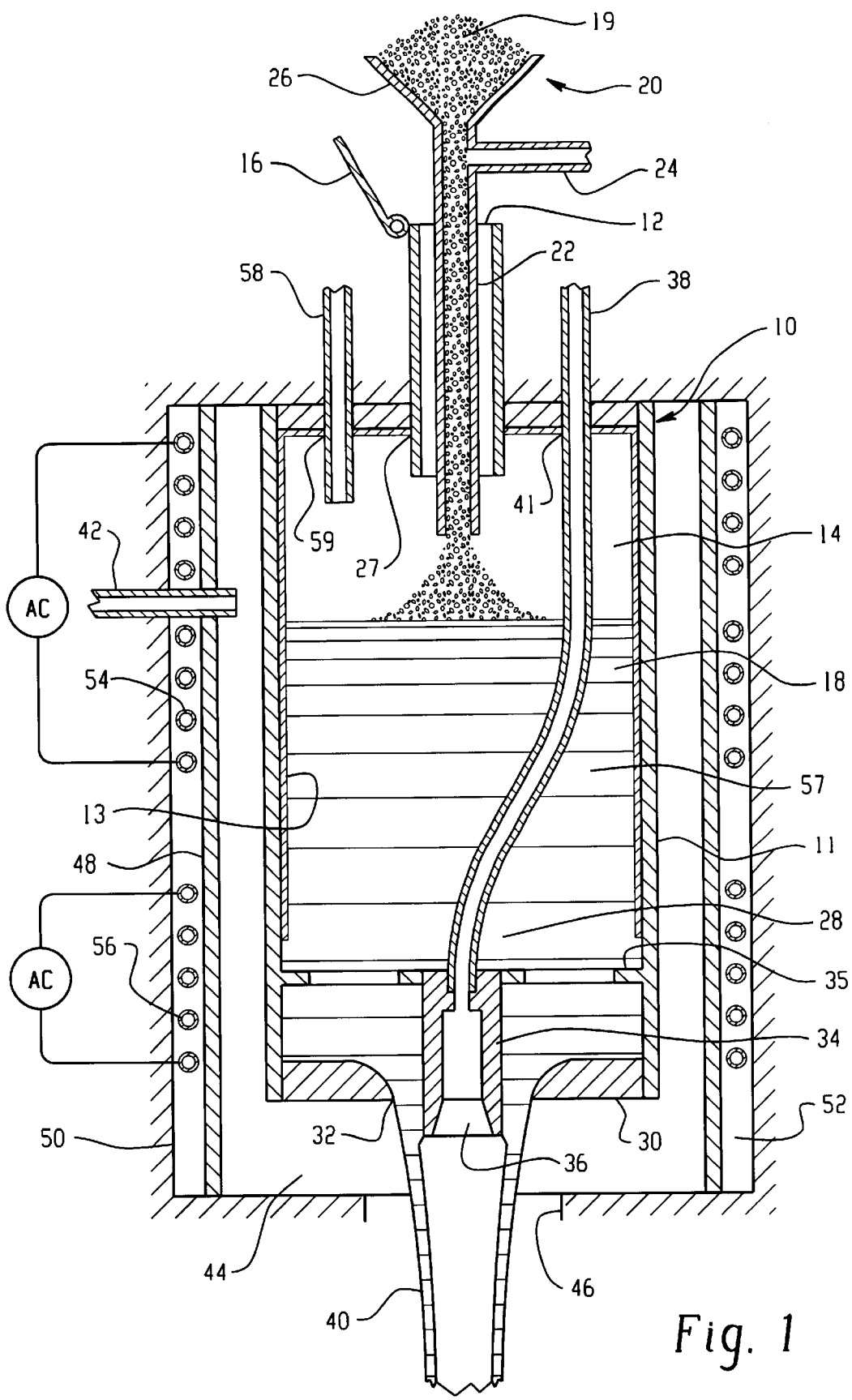
FIG. 1 is a longitudinal sectional view of a furnace of the present invention.

In one of its preferred embodiments, the fused quartz product of the present invention can be formed in a furnace configuration having the features shown in FIG, 1. Moreover, FIG. 1 demonstrates the suitability of the present inventive construction technique in the rebuild of an existing furnace design. More particularly, the furnace has a general cylindrical shape. Preferably, an elongated cylindrical melting crucible 10 constructed of a refractory metal layer 11, such as tungsten or molybdenum as well as combinations thereof, is used. The melting crucible 10 further includes a continuous lining of rhenium 13 over the refractory metal layer 11 throughout an upper melting zone 14 and into the melt 18.

A purified sand raw material is fed through a top opening tube 12 into the upper melting zone 14 of the crucible 10. The top opening tube 12 is provided with movable closure means 16, such as a trapdoor which can be kept closed except for observing the level of the melt 18 and during feeding of the raw material 19 into the crucible 10. Automatic feeder means 20 is provided at the top opening of the crucible 10 to maintain a predetermined level of the raw material in the crucible 10. The feeder includes a discharge tube 22 having its outlet opening located in the crucible 10 so as to provide the raw material in the upper melt zone 14 where melting takes place, a purge gas inlet tube 24 and reservoir means 26 which contains supply of the raw material being fed automatically to the discharge tube. To provide a suitably controlled melting zone gas atmosphere, top tube opening 12 is preferably welded around its periphery 27 to form a gas-tight seal with rhenium lining 13.

Simple gravity flow of the raw material to the melting zone of the crucible member takes place as the melt level in the crucible drops with fusion of the sand particles. The purge gas being supplied to the feeder helps eliminate gases contained in the raw material which could form bubbles in the fused quartz melt. The composition of the purge gas is selected to reduce bubbles and ridges in the final product and which may consist of a gas mixture of hydrogen and helium in the volume ratios 40–100% hydrogen and 60–0% helium. In addition, the substantially gas-tight environment created by non-reactive rhenium facilitates the introduction of reactive gases if desired.

The lower portion 28 (a drawing zone) of the crucible 10 includes an annular ring 30 having central opening 32 through which the elongated fused quartz member is continuously formed by drawing the viscous material through the opening. A core 34 is centrally disposed in the opening 32 and extends below the annular ring as the means of forming tubing from the viscous material being drawn from the melt. As known by the skilled artisan, the position of the core can be shifted as necessary to produce the desired size of extrudate. Support element 35 is affixed to the wall of the crucible and provides rigid support of the core which helps to maintain a constant size opening from which the product is being drawn. The core is fabricated with a hollow interior 36 which is connected to inlet pipe 38 so that a supply of non-oxidizing gas having a different composition than supplied to the melting zone of the crucible can be furnished as a forming atmosphere while the tubing 40 is being drawn. In accordance with the invention, inlet pipe 38 is welded (or otherwise sealed) to rhenium lining 13 at 41 to maintain a sealed upper melting zone 14.

A second inlet pipe 42 supplies a forming atmosphere which can be a mixture containing hydrogen in a non-oxidizing carrier gas such as nitrogen in volume ratios 1–20% hydrogen and 99–80% carrier gas as a protective atmosphere which surrounds the exterior wall of the crucible. This supply of forming gas is provided to annular space 44 which provides a housing means for the crucible and includes a central bottom opening 46 providing exhaust from said cavity for the forming gas in a manner which envelops the exterior surface of the elongated fused quartz member being drawn from the furnace. The exterior wall of the annular space comprises a refractory cylinder 48 which in combination with exterior housing 50 of the furnace construction serves as the container means for the induction heating coils of the apparatus. More particularly, a concentric passageway 52 is defined between the exterior wall of the refractory cylinder 48 and the interior wall of housing 50 in which is disposed two helical-shaped induction heating coils 54 and 56 supplying separate heating sources for the upper and lower zones of the crucible, respectively. Of course, additional coils may be employed as governed by the size of the furnace, for example, it may be beneficial to include additional coil(s) in fining zone 57.

The heating sources and the power supplies thereto can be of conventional construction which include electrical conductors that are hollow for water cooling and electrically connected to separate A.C. power supplies for the independent heating utilized in the practice of the present invention. The remainder of the passageway occupied by the coils is preferably packed with a stable refractory insulation such as zirconia in order to conserve heat in the furnace.

A third supply pipe 58 is located in the top section of exterior housing 50 and supplies a purge gas mixture (or a reactive gas if desired) to the melting zone 14 of the crucible. Of course, a weld is created at 59 to form a gas-tight seal between pipe 58 and rhenium lining 14. The above-described furnace is operated in connection with conventional tube or rod drawing machinery which has been omitted from the drawing as forming no part of the present invention.

Of course, the present inventive use of a non-reactive crucible lining is not limited to the furnace or crucible shown in FIG. 1. In fact, the use of the non-reactive lining is suitable for use in any furnace/crucible embodiment known to the skilled artisan (e.g. FIG. 2).

In accordance carrying out the process of the present invention in the above-described apparatus, a natural silica sand having a nominal particle size of –50 mesh U.S. screen size which has been purified by chemical treatment to the nominal impurity content below is supplied to the top opening of the crucible member in the apparatus.

| | RAW MATERIAL | |
|---|---|---|
| Impurity | Natural (p.p.m.) | Synthetic (p.p.m.) |
| $Fe_2O_3$ | 1 | 0.07 |
| $TiO_2$ | 2 | <.02 |
| $Al_2O_3$ | 20 | 100 |
| CaO | 0.4 | <.01 |
| MgO | 0.1 | <.05 |
| $K_2O$ | 0.6 | 0.1 |
| $Na_2O$ | 0.7 | 0.1 |
| $Li_2O$ | 0.6 | <.05 |
| B | <0.2 | — |
| $ZrO_2$ | <1.0 | <.02 |

The above raw material is provided to the crucible member which has been heated in excess of 2050° C., preferably in excess of about 2350° C. After a predetermined melt level of fused quartz has been established in the crucible and the molten material caused to flow by gravity through central bottom opening 32 in the crucible member, tubing or rod is then drawn continuously by the drawing machine (not shown) in the presence of a forming gas atmosphere. In any continuous drawing of tubing/rod in the foregoing described manner, the electrical power being supplied to the lower heating coil 56 is typically maintained at a lower level than the electrical power being supplied to the upper heating coil 54 in order to lower the temperature of the material as it is being drawn to below a temperature of 2050° C.

As stated above, the internal surface of the melting zone 14 furnace crucible 10 includes a rhenium, osmium or iridium sheet or coating 13. The coating 13 may be applied to the refractory metal layer 11 by chemical vapor deposition, electrolysis, plasma spray or any other technique known to the skilled artisan (hereinafter referred to as "chemical bonding"). The non-reactive layer 13 may also be physically attached to the refractory metal layer 11 by attaching a sheet directly to the wall of the crucible with rivets, bolts, screws, etc., preferably constructed from the same or similar material as the non-reactive lining itself Alternatively, a properly shaped rhenium sleeve can be inserted into the crucible. In fact, a combination of coating or lining methods may be used depending on the geometric complexity of the segments comprising the crucible assembly. In accordance with the present invention, it should be noted that these methods of attachment may require further sealing of the fastening members which is necessary to prevent vapor phase transport from outside the lining (i.e. a nongas-tight lining)

Figure 2:
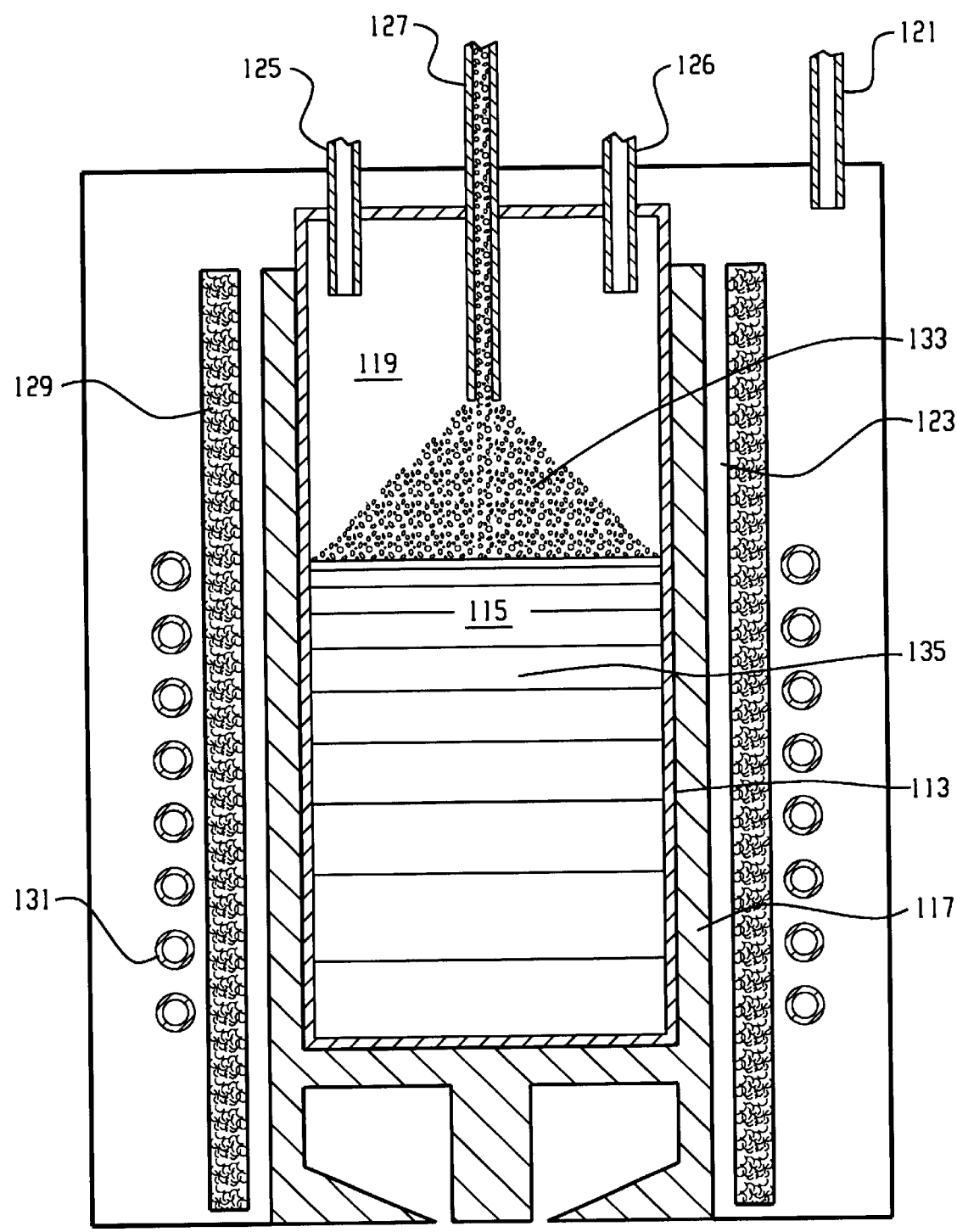
FIG. 2 is a schematic view of a furnace demonstrating the present inventive construction.

Referring now to FIG. 2, the application of the present inventive coating applied to the entire crucible is demonstrated. Moreover, a coating of rhenium 113 is applied on the inner wall 117 of the crucible 119. In this manner, the entire system is protected from tungsten/molybdenum contamination by the barrier layer. This protection is supplemented by feeding a dry hydrogen gas through tube 121 to the space 123 between cup 113 and walls 117. A tube 125 is provided to feed wet hydrogen into the melt zone 115, and a tube 126 is provided to exhaust wet hydrogen gas. Of course, proper seals are provided between tube 125 and sand feed tube 127 to create a gas barrier within cup 113. As is conventional in the art, a layer of insulation 129 is disposed between tungsten walls 117 and the induction heating coils 131. As shown in this embodiment, feed sand 133 is beneficially in a wet hydrogen environment 119 as it fuses into a molten state 135 for eventual product forming.

While the invention has been described by reference to preferred embodiments, it will be understood by those skilled in the art that various changes may be made and equivalents may be substituted for elements without departing from the scope of the invention. In addition, any modifications may be made to adapt a particular situation or material to the teachings of the invention without departing from the essential scope thereof. Therefore, it is intended that the invention not be limited to the particular embodiment disclosed as the best mode contemplated for carrying out this invention, but the invention will include all embodiments falling within the scope of appended claims.

What is claimed is:

1. A furnace for melting silica into a desired shape, said furnace comprising a body having a melting zone, a drawing zone, and a gas feed inlet into said melting zone, said melting zone comprising a refractory material wall including a substantially gas-tight continuous inner lining of a non-reactive barrier material, and a gas tight seal being provided between said gas feed inlet and said barrier material.

2. The furnace of claim 1 wherein said barrier material comprises rhenium, osmium, iridium and mixtures thereof.

3. The furnace of claim 1 wherein said refractory material comprises tungsten, molybdenum or mixtures thereof.

4. The furnace of claim 1 wherein said melting silica is carried out at temperatures greater than about 2050 ° C.

5. A furnace for melting silica for fusion into a desired shape, said furnace comprising a body forming a chamber having a generally vertically oriented longitudinal axis, said chamber including at least an upper melting zone and a lower drawing zone, said melting zone comprised of a first layer of a refractory material and a barrier layer comprised of a protective material selected from rhenium, osmium, iridium, and mixtures thereof disposed on an inner surface of said first layer, said barrier layer extending at least from below a melt line to a top and side walls of the chamber, said barrier layer forming a substantially gas-tight atmosphere in said melting zone, and a silica feed member through said wall and into a top portion of said melting zone, said feed member forming a gas-tight seal with said barrier layer.

6. The furnace of claim 5 wherein said refractory material is comprised of tungsten, molybdenum or mixtures thereof.

7. The furnace of claim 5 wherein said protective material comprises rhenium.

8. The furnace of claim 5 wherein said barrier layer is between about 0.010 and 0.050 inches in depth.

9. The furnace of claim 5 wherein said barrier layer is chemically bonded to said first layer.

10. The furnace of claim 5 wherein said barrier layer is physically attached to said first layer.

11. The furnace of claim 5 wherein said barrier layer is attached via rivets, bolts or screws to said first layer.

12. The furnace of claim 11 wherein said barrier layer comprises a sleeve, sized to mate concentrically with said first layer.

13. The method of claim 11 wherein said material comprises rhenium.

14. The method of claim 11 wherein said fusion temperature is above about 2350° C.

15. The furnace of claim 5 comprising at least one gas inlet into said melting zone, said gas inlet forming a gas-tight seal with said barrier layer.

16. The furnace of claim 5 wherein said barrier layer is also located in said drawing zone of said crucible.

17. The method of claim 15 wherein said member includes less than 1 ppb tungsten and molybdenum.

18. A continuous method of forming an elongated fuse quartz member which comprises:

a) continuously feeding a generally $SiO_2$ raw material in particulate form into an induction heated furnace, said furnace including a gas-tight inner surface comprised of a material selected from rhenium, osmium, iridium and mixtures thereof, b) fusing said raw material continuously in the furnace being supplied with an inert gas atmosphere while maintaining a fusion temperature, and, c) drawing the fused material continuously from furnace.

* * * * *